United States Patent [19]
Ogden

[11] 3,964,291
[45] June 22, 1976

[54] TENNIS RACQUET STRINGING CALIBRATOR

[76] Inventor: John M. Ogden, 6540 Parkland, Cincinnati, Ohio 45233

[22] Filed: Oct. 2, 1975

[21] Appl. No.: 618,791

[52] U.S. Cl. ................................. 73/1 B; 73/145; 273/73 A
[51] Int. Cl.² .......................................... G01L 5/06
[58] Field of Search ............. 73/1 B, 145; 273/73 A

[56] References Cited
UNITED STATES PATENTS

| | | | |
|---|---|---|---|
| 2,390,802 | 12/1945 | Mars | 73/1 B |
| 3,635,080 | 1/1972 | Krueger et al. | 73/145 |
| 3,823,609 | 7/1974 | Miyagawa et al. | 73/145 |

*Primary Examiner*—Richard C. Queisser
*Assistant Examiner*—Frederick Shoon
*Attorney, Agent, or Firm*—John G. Schenk

[57] ABSTRACT

A calibration device is disclosed and claimed herein for determining the accuracy of a tennis racquet stringing machine. A cross member is securable in the machine in similar fashion to a racquet being secured for stringing therein. The cross member has a frame secured thereto and extending outwardly therefrom with the frame having a resistance member, preferably a spring loaded scale, secured thereto. An elongated element such as a non-extensible wire is secured to the resistance member to be pulled in the machine in similar fashion to a racquet string. When the element is pulled, the resistance member is encountered and at the proper time, will determine the pounds of pull on the elongated element. The determined pull can be compared to settings on the stringing machine to determine accuracy thereof for calibration purposes.

11 Claims, 6 Drawing Figures

TENNIS RACQUET STRINGING CALIBRATOR

BACKGROUND OF THE INVENTION

Machines have been in existence for some years for restringing or original stringing of tennis racquets. Tennis racquets are normally strung with strings made from materials such as nylon, gut or the like. Main strings are placed longitudinally of the head and cross strings transversely of the head to provide the surface for contact with the tennis ball. A quality tennis racquet is usually unstrung at the time of sale and can then be strung to the custom desires of the purchaser, or in general, with good strings for the normal amateur.

Under normal circumstances, the tennis racquet would be strung both as to the main strings extending along the axial length of the head and the cross strings extending perpendicularly to the main strings, in a tension range of 55 to 60 pounds of pull. In this range of pull, however, substantial differences exist as to the overall effect.

A tennis racquet has a total of 38 strings and each pound of variation is amplified by a factor of 38. Hence in a five pound range an overall difference of approximately 190 pounds results. In the professional ranks, a difference between 52 and 55½ pounds of string tension, for example, is significant to the result that the game of a particular professional could be adversely affected by the difference. It is thus extremely important to string a tennis racquet at a proper tension.

Tennis racquet stringing machines presently in use are capable of being preset to achieve a predetermined tension on the strings as they are being strung in the racquet. Experience has proved, however, that the stringing machines are generally inaccurate and that the pounds of pull registered on an indicator for setting the machine may be off in either direction. One stringing a racquet at 55 pounds, for example, may achieve 54 or 56 pounds. In this vein, numerous complaints have been lodged where racquets strung on the same machine at a particular pound pull have seemed too tight to certain individuals and too loose to others. Such a problem presents several areas of consternation. For example, an individual having a racquet strung does not, in fact, know what tension to order when a racquet purportedly strung at 55 pounds tension, in fact is strung at 56 or 54 pounds tension. The individual is thus discontent and unsure as to the correct tension necessary to achieve his particular goal.

The calibration device of the present invention now affords an opportunity to quickly and economically calibrate each tennis racquet stringing machine. One may now properly string a racquet at a known string tension which is consistent with the desires of the user of the racquet. This capability is particularly important to a tennis professional traveling on the tennis circuit where numerous racquets will be strung at many different times and locations. A 55 pound string tension on the stringing machine at the pro's home may be exactly to his liking. A further stringing machine, however, out on the circuit may indicate 55 pound tension, while at the same time, string the racquet at a 56 pound tension. This tension inaccuracy could throw off the game of the professional significantly, to the point where a subpar performance is given to the financial and pride detriments of the professional. The device of the present invention now permits each machine to be calibrated before stringing each racquet whereby the exact pound pull requested will always be provided.

No prior art is known that would anticipate or suggest the present invention.

SUMMARY OF THE INVENTION

It is an object of the present invention to provide a device for calibrating a tennis racquet stringing machine.

Another object of the present invention is to provide a device for calibrating all types of tennis racquet stringing machines under actual operating conditions.

Yet another object of the present invention is to provide a device for calibrating a tennis racquet stringing machine where calibration readings may be read directly therefrom.

Generally speaking, the present invention relates to a calibration device for a tennis racquet stringing machine where during stringing, a racquet is secured to the machine and racquet strings are installed at a preset number of pounds tension, comprising a cross member that is secureable to the stringing machine; a frame secured to said cross member and extending outwardly therefrom; a resistance member secured to said frame and being preset to offer a certain resistance to pull along said frame; and an elongated element secured to said resistance member and being pullable axially with respect to said frame in a same plane in which a racquet string is pulled, whereby upon pulling said elongated element in similar fashion to a string being strung in a racquet, the resistance member will indicate the pounds of tension on said member which can then be compared to settings on said machine for calibration of same.

More specifically, the calibration device of the present invention is securable in a stringing machine in the same manner as the head of a tennis racquet would be secured therein. The elongated element, preferably a nonextensible wire, is preferably secured to a portion of a scale that has a spring tension thereagainst. The wire element is passed through the stringing machine in the same fashion as a tennis racquet string, being handled by the appropriate clamping mechanisms or the like of the particular machine. At the appropriate preset stringing pull for the machine, as dictated by the settings thereon, the scale of the resistance member, can then be visually observed for a correct tension reading. This tension reading can then be compared to tension settings of the machine to determine the correctness of the stringing machine settings. If the machine tension setting is erroneous, the machine tension setting scale can be readjusted to conform to the reading of the calibration device. Thereafter, the stringing machine is calibrated, at least for that registered pound of pull.

A spring operated scale is a preferred resistance member with a straight scale being most preferred. Other types of scales, weighted elements, inclined plane arrangements, or the like may, however, be utilized to provide the desired resistance to pull on the elongated wire element. The preferred straight scale is one where a spring provides the resistance, with extension of the spring moving an indicator along an indicia scale to directly provide the pounds of pull on the spring. A forward end of a scale element to which the elongated wire is secured, preferably has a hook-like shoulder thereon for engagement with a cross strut of the frame. Such engagement allows a certain tension to be maintained on the spring to reduce the movement of the elongated wire across the desired poundage range, paralleling the degree of movement that a racquet string would likewise experience during stringing.

The straight scale is preferably pivotally secured to the frame. Upward pivotal movement of the scale can be affected to disengage the hook shoulder of the scale element from the cross member of the frame and allow unimpeded retraction of the spring.

Use of the device of the present invention is practical to calibrate tension on the stringing machine, even prior to the stringing of each racquet. One can thereby completely rely on the string tension at which his racquet would be strung. Likewise, each stringing machine would be accurate, regardless of the techniques for stringing.

In physical arrangement, the calibration device of the present invention should permit pull on the elongated element through the stringing machine in the amount and along the same plane as a racquet string would be pulled during the stringing of a tennis racquet. The cross member is secured in the same location as the head for stringing, with the resistance member being perpendicular thereto, and having the elongated wire element passing through an appropriate guide member and experiencing very little friction therein. In this embodiment, the calibration device of the present invention is very accurate.

DESCRIPTION OF THE PREPARED EMBODIMENTS

Figure 1:
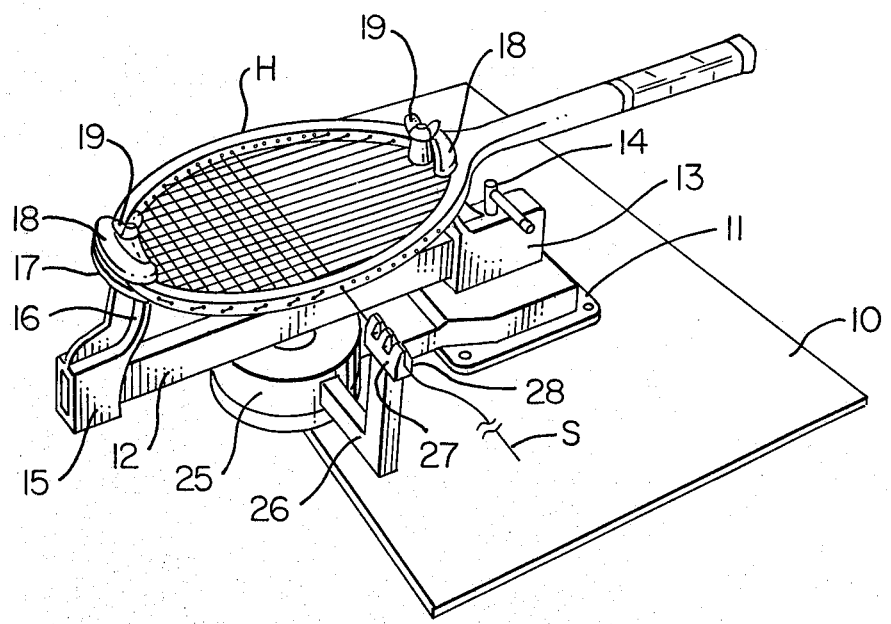
FIG. 1 is an illustration of a tennis racquet stringing machine having a racquet secured therein for stringing.

Referring to the Figures, preferred embodiments of the present invention will now be described in detail. FIG. 1 illustrated one of the types of commercial machines for stringing tennis racquets. The machine is secured in a desired fashion and by suitable means to a bench or other support 10 at a base 11. Associated with base 11 is a bar 12 along which a slide 13 is adjustably moveable. An adjustment nut 14 or the like locks slide 13 in place on bar 12. A fixed arm 15 is secured to an opposite end of bar 12. Slide 13 may thus be moved along bar 14 to provide a desired adjustment for the longitudinal or transverse portion of the head of a tennis racquet to be received between fixed arm 15 and slide 13. Slide 13 and fixed arm 15 have bottom and top clamps 17 and 18 respectively associated therewith with the head H of a tennis racquet to be received therebetween. A wing nut 19 or the like applies force against top clamp 18 to secure head H of the racquet between top and bottom clamps 17 and 18. In this fashion, the head of the tennis racquet is secured in place.

A turn table 25 is located beneath the tennis racquet holding apparatus and has an arm 26 extending outwardly and upwardly therefrom. A clamp 27 for holding the racquet strings is provided on an upper portion of arm 26. As illustrated in FIG. 1, a racquet string S is hand fed through the appropriate opening either in a longitudinal or transverse direction of the tennis racquet head H and is pulled through clamp 27 being held by jaws 28 of same. Normally speaking, the clamp 27 which may be one of a number of different types will slip once the stringing pressure setting has been overcome. If, for example, a desired stringing setting of 55 pounds has been preset into the stringing machine, a pull of 56 pounds will cause string S to slip through the jaws 28 of clamp 27. In addition to clamp 27, further clamping means are provided, though not shown for the purpose of holding the string S in proper location in head H once the tension has been produced thereon. These clamps are normally provided on the interior of the racquet head during the stringing operation. They do not, however, form a part of the present invention except by way of environment and are thus not illustrated.

Once a string has been pulled through the appropriate openings, and is being held by the internal clamps, turn table 25 can be rotated, moving clamp 27 around the periphery of head H of the tennis racquet such that each individual main and cross string may be inserted and tensioned appropriately for the racquet.

Figure 2:
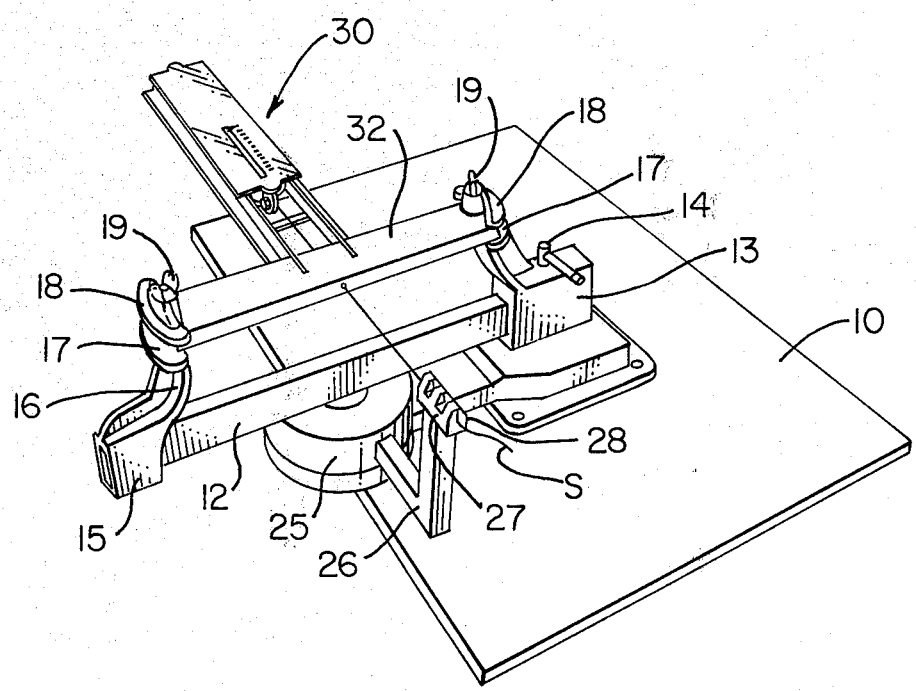
FIG. 2 is an illustration of a tennis racquet stringing machine having the calibration device of the present invention secured therein.
Figure 3:
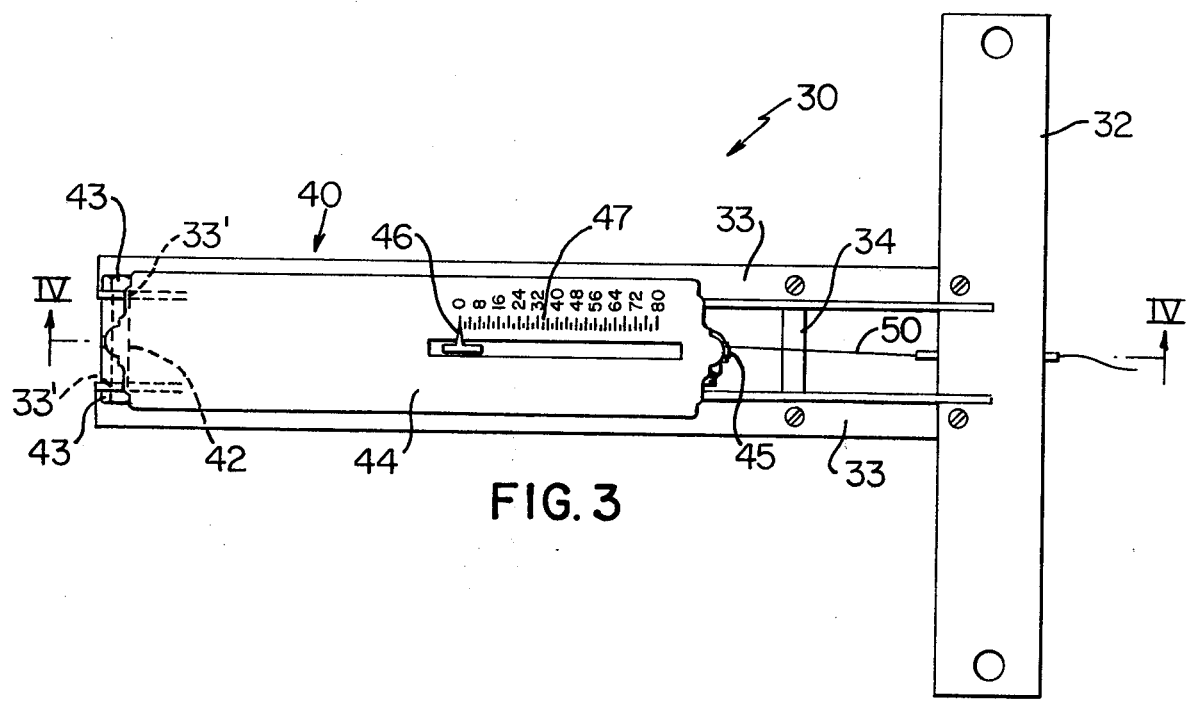
FIG. 3 is a plan view of a calibration device according to the teachings of the present invention.
Figure 4:
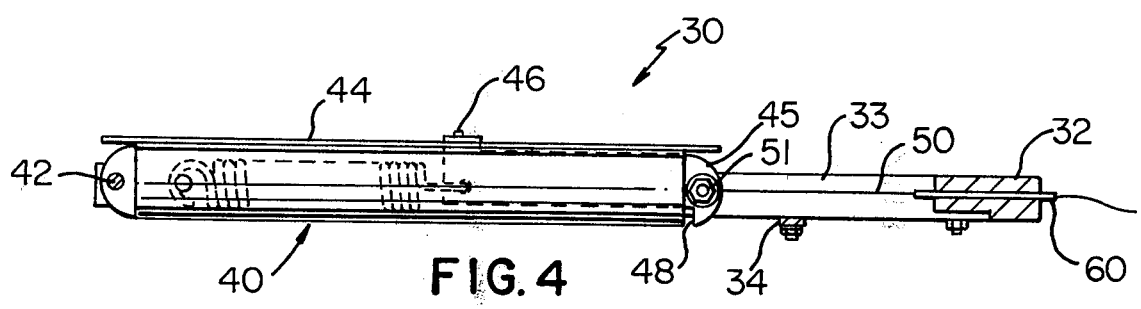
FIG. 4 is a vertical cross sectional view of the device of FIG. 3 taken along a line IV—IV.
Figure 5:
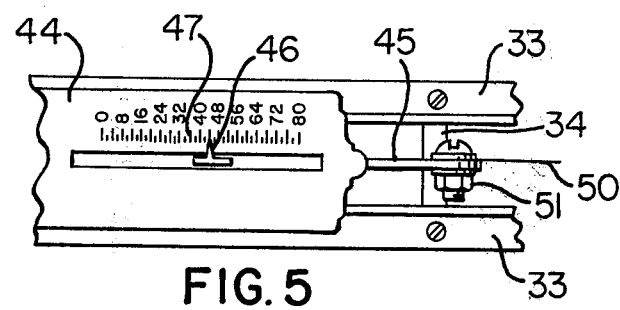
FIG. 5 is a cutaway plan view of a portion of the scale and frame of the calibration device of the present invention.
Figure 6:
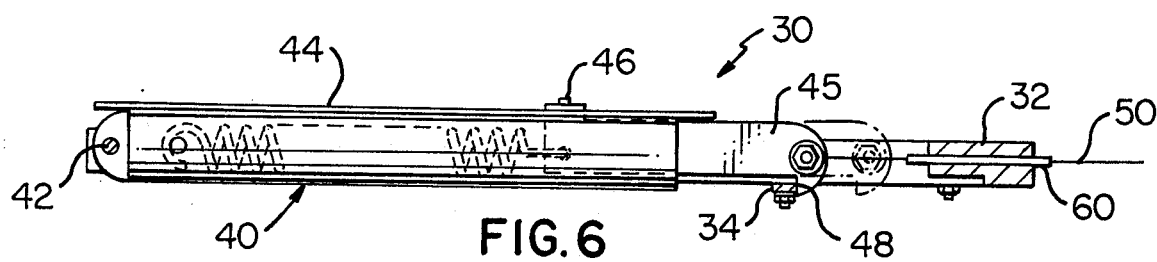
FIG. 6 is a side elevational view in cross section that is likewise taken along a line IV—IV and that illustrates a further portion of the function of the device as illustrated in FIG. 5.

In FIG. 2, the same type stringing machine is illustrated with the calibration device of the present invention generally indicated as 30 being held instead of a tennis racquet head. Note that slide bar 13 has been appropriately located to receive a cross member 32 of calibration device 30 with the outer extremities of cross member 32 being held between bottom and top clamps 17 and 18 respectively and secured therein by tighting of wing nuts 19. Calibration device 30 is thus secured in place in the stringing machine in the same fashion in which a tennis racquet would be secured for stringing. The calibration device 30 is now in position to properly determine whether the tension settings for the stringing machine are accurate, and if not, to enable adjustment of the settings to provide accurate tensioning of the strings during stringing of tennis racquets.

Referring to FIGS. 3–6, in conjunction with FIG. 2, the calibration device 30 of the present invention will now be further described in detail. As mentioned above, the calibration device 30 is provided with a cross member 32 whose length is the same as the length of the head of a tennis racquet. Secured to cross member 32 of calibration device 30 are a pair of frame members 33 which in a preferred arrangement are L shaped in cross section and extend outwardly in perpendicular fashion to cross member 32. Frame members 33 are preferably spacially separate as illustrated and have a cross strut 34 secured therebetween, the purpose of which will be described hereinafter. At an outer end of frame members 33 a resistance member generally indicated as 40 is secured. Resistance member 40 illustrated in the Figures is pivotally secured between frame members 33 by a bolt 42 that passes through appropriate openings 33' with a pair of nuts 43 provided around bolt 42.

While the resistance element 40 may take a different form so as to provide a predetermined resistance to the pulling of an elongated element 50 secured thereto, a spring operated scale is preferred. As mentioned earlier, however, incline plane arrangements, weighted elements and the like may likewise be used as desired, to satisfy a main purpose to offering a predetermined and known resistance to the pulling of elongated element 50. In a most preferred arrangement a straight scale 44 is employed which includes a forward force element 45 that is provided with an opposite end of same being secured to a spring received within scale 44 and offering a predetermined resistance to the outer movement thereof. An indicator 46 is provided along a portion of the force element 45 and is movable along indicia 47 to indicate directly the exact number of pounds of force being applied to forward element 45 at any particular time.

Force element 45 may have a hook-like shoulder 48 at the forward thereof adjacent the connection between force element 45 and elongated member 50. In most racquet stringing machines, the racquet string S is moved for only a matter of one and one half inches or so beyond the elastic stretch of the string. It is quite desirable therefore, that in calibrating a racquet stringing machine, the elongated element 50 should likewise move a similar amount. A first tension setting is thus provided where elongated element 50 is pulled for a sufficient length to permit shoulder 48 of force element 45 to pass beyond cross member 34 of frame 33. Release of tension on elongated element 50 thus permits hook 48 to engage cross strut 34 and hold member 45 against retraction within scale 44. Generally, hook 48 contacts cross member 34 at a predetermined pressure of 35–40 pounds as is displayed by indicator 46 on indicia 47. The first stage setting thus exits where shoulder 48 engages cross strut 34 as is illustrated in solid lines in FIG. 6.

Elongated element 50 as disclosed herein should preferably be a material that will withstand the rigors of continued testing. Likewise, it is most preferred that element 50 be virtually nonextensible to avoid stretch that is normally attendent to a tennis racquet string. A stainless steel wire has been found to be quite suitable for this purpose. The preferred stainless steel wire element 50 is thus secured in any suitable fashion as exemplified by a bolt arrangement 51 to the force element 45 of scale 44 and extends outwardly beyond cross member 32, passing through a suitable guide 60. Guide 60 insures that element 50 proceeds along an intended path of travel to simulate the path of a racquet string being strung. Guide 60 is preferably a polytetrafluoroethylene tube, marketed under the trademark, TEFLON, by E. I. duPont de Nemours and Company, Wilmington, Delaware. This polytetrafluoroethylene tubing offers very little resistance to lessen inaccuracy of calibration readings.

With the machine in proper order and with scale force element 45 being held in position one by strut 34, additional pull may be instituted on wire element 50 to duplicate the stringing operation. Scale force element 45 then moves forward to a position indicated in broken lines in FIG. 6 where the appropriate calibration reading is provided by indicator 46 along indicia scale 47. At this point, the tension reading is taken and the result is compared to the setting on the stringing machine. Like tension figures indicate an accurate setting on the machine.

In general operation, the calibration device 30 of the present invention is secured to the racquet stringing machine by clamps 17 and 18. Elongated wire element 50 is then directed through guide 60 to the appropriate portion of the stringing machine where a prepull on element 50 is applied to extend force element 45 beyond strut 34. Tension on element 50 is then released such that hook 48 engages cross strut 34 and is held thereby. Further application of force is then applied to wire 50, now in clamp 27, simulating stringing of the tennis racquet. After the appropriate string tension as set on the machine has been exceeded, wire 50 slips through clamp jaws 28, but continues to be held under tension by clamps within the racquet head. A reading on scale 47 indicated the pressure at which the racquet is strung at the particular setting. If the figures match, the stringing machine is accurate for that particular pressure. Thereafter, upon release of tension on element 50, force element 45 returns to rest at cross strut 34. If it is desired for the force element 45 to return to rest within scale 44, wire 50 can be pulled forward moving shoulder 48 away from strut 34. At that point scale 44 can be pivoted upwardly around bolts 42 and tension on wire 50 released while scale 44 is in the upward position. Force element 45 will then return unimpeded to its rest position. It should be pointed out, however, that instead of pivoting scale 44, cross strut 34 could likewise be pivotally or otherwise secured to frame 33 to be moved out of the path of travel of hook 48 and permit return of scale 44 to an inactive position.

Having described the present invention in detail, it is obvious that one skilled in the art will be able to make variations and modifications thereto without departing from the scope of the invention. Accordingly, the scope of the present invention should be determined only by the claims appended hereto.

What is claimed is:
1. A device for calibrating a tennis racquet stringing machine where during stringing a racquet is secured on the machine and racquet strings are installed at a preset number of pounds of tension comprising:
   a. a cross member that is securable to the stringing machine;
   b. a frame secured to said cross member and extending outwardly therefrom;
   c. a resistance member secured to said frame and being preset to offer a certain resistance to pull along said frame; and
   d. an elongated element secured to said resistance member and being pullable axially with respect to said frame in the same general plane that a racquet string would be pulled, whereby upon handling said element in similar fashion to a string being installed in a racquet, the resistance member will indicate the pounds of pull on said member which can then be compared to settings on said tennis racquet stringing machine for calibration of same.

2. A tennis racquet stringing machine calibration device as defined in claim 1 wherein the frame secured to said cross member comprises two elongated elements secured to said cross member and extending outwardly therefrom in approximate parallel relationship, said frame having at least one cross strut secured therebetween.

3. A tennis racquet stringing machine calibration device as defined in claim 1 wherein the resistance member is a straight scale with resistance being provided by a spring and having an indicator that is calibrated to indicia to determine the pounds of tension said spring.

4. A tennis racquet stringing machine calibration device as defined in claim 3 wherein the scale is secured to said frame.

5. A tennis racquet stringing machine calibration device as defined in claim 4 wherein the scale is secured to said frame at an outer end only so as to permit upward pivotal movement of said scale.

6. A tennis racquet stringing machine calibration device as defined in claim 5 wherein said scale has a hook shoulder at a forward force element thereof to which the elongated element is secured and which is engageable with said frame strut at a predetermined extension.

7. A tennis racquet stringing machine calibration device as defined in claim 1 wherein the elongated element is nonextensible in character.

8. A tennis racquet stringing machine calibration device as defined in claim 7 wherein the nonextensible element is a wire.

9. A tennis racquet stringing machine calibration device as defined in claim 1 wherein a tubular guide member is secured to said cross member to direct pull on said elongated element in a correct axial direction.

10. A tennis racquet stringing machine calibration device comprising a cross member securable to said machine; a pair of elongated elements secured to said cross member and extending outwardly therefrom; a straight spring scale pivotally secured to said outwardly extending members at an outer end thereof; an elongated piece of nonextensible wire secured to a portion of said spring; whereby said cross member may be secured to said stringing machine and said nonextensible elements may be pulled to similar fashion to a racquet string such that the pounds of pull may be indicated on said scale and said pounds may be compared to the setting on the machine to determine the accuracy of same.

11. The calibration device as defined in claim 10 wherein a strut is provided between said frame members at a predetermined distance from said scale and wherein said scale has a hook shoulder that is engageable with said strut so as to prevent the retraction of said scale member beyond said strut.

* * * * *